US008527633B2

(12) United States Patent
Bade et al.

(10) Patent No.: US 8,527,633 B2
(45) Date of Patent: Sep. 3, 2013

(54) TECHNIQUES FOR ADDRESSING GEOGRAPHICAL LOCATION ISSUES IN COMPUTING ENVIRONMENTS

(75) Inventors: Steven A. Bade, Albany, NY (US); Harold Moss, III, Danvers, MA (US); Mary Ellen Zurko, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/985,529

(22) Filed: Jan. 6, 2011

(65) Prior Publication Data

US 2012/0179817 A1    Jul. 12, 2012

(51) Int. Cl.
*G06F 15/173*    (2006.01)
*G06F 9/46*    (2006.01)

(52) U.S. Cl.
USPC ............ 709/225; 718/105; 718/104; 709/226

(58) Field of Classification Search
None
See application file for complete search history.

(56) References Cited

U.S. PATENT DOCUMENTS

| | | | |
|---|---|---|---|
| 6,513,061 B1 | 1/2003 | Ebata et al. | |
| 6,895,483 B2 | 5/2005 | Eguchi et al. | |
| 7,472,172 B2 * | 12/2008 | Anderson et al. | 709/219 |
| 7,584,353 B2 | 9/2009 | Risan et al. | |
| 7,669,225 B2 | 2/2010 | Peled et al. | |
| 7,685,279 B2 | 3/2010 | Miltonberger et al. | |
| 7,765,197 B2 | 7/2010 | Fujiyama et al. | |
| 8,230,069 B2 * | 7/2012 | Korupolu | 709/226 |
| 8,341,626 B1 * | 12/2012 | Gardner et al. | 718/1 |
| 2004/0078490 A1 | 4/2004 | Anderson et al. | |
| 2004/0148191 A1 | 7/2004 | Hoke, Jr. | |
| 2008/0177647 A1 | 7/2008 | Veenstra | |

\* cited by examiner

*Primary Examiner* — Andrew L Nalven
*Assistant Examiner* — Quy Pham
(74) *Attorney, Agent, or Firm* — Yudell Isidore Ng Russell PLLC

(57) ABSTRACT

A technique for addressing geographical location issues in a computing environment includes receiving, at a data processing system, location information indicating a permissible geographical location in which a virtual machine image for a consumer may be deployed. A request for an exception to deploy the virtual machine image outside of the permissible geographical location is issued, from the data processing system. An exception grant or an exception denial is received, at the data processing system, from the consumer in response to the request. The virtual machine image is deployed, using the data processing system, to one or more servers in the computing environment that are outside of the permissible geographical location in response to receipt of the exception grant. The virtual machine image is deployed, using the data processing system, to one or more servers in the computing environment that are within the permissible geographical location in response to receipt of the exception denial.

20 Claims, 5 Drawing Sheets

TECHNIQUES FOR ADDRESSING GEOGRAPHICAL LOCATION ISSUES IN COMPUTING ENVIRONMENTS

BACKGROUND

1. Technical Field

The present invention generally relates to addressing geographical location issues in computing environments and in particular to techniques for addressing geographical location issues in cloud computing environments.

2. Description of the Related Art

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread adoption of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like the physical machine. VMs are usually categorized as system VMs or process VMs. A system VM provides a complete system platform that supports the execution of a complete operating system (OS). In contrast, a process VM is usually designed to run a single program and support a single process. A characteristic of a VM is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing sites (via the Internet) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

An Internet point-of-presence (POP) is an access point to the Internet that may house servers, routers, gateways, asynchronous transfer mode (ATM) switches, and/or digital/analog call aggregators. An Internet POP may be, for example, part of the facilities of a telecommunications provider that an Internet service provider (ISP) rents or at a location separate from the telecommunications provider. A typical ISP may have thousands of POPs, each of which corresponds to a different physical location. In a POP cloud, it is usually unclear to a cloud consumer where data of the cloud consumer resides, as a location of an access point (e.g., gateway) appears to the cloud consumer to be the location of the data. When a cloud consumer has needed to comply with location-based data requirements (e.g., different country/state laws related to data encryption to achieve a desired privacy), the cloud consumer has frequently queried a cloud vendor (host) in order to identify the location of their data. Unfortunately, frequently querying a cloud vendor in order to identify the location of data results in operational drains on both the cloud vendor and cloud consumer.

BRIEF SUMMARY

Disclosed are a method, a data processing system, and a computer program product (embodied in a computer-readable storage medium) for addressing geographical location issues in cloud computing environments.

A technique for addressing geographical location issues in a computing environment includes receiving, at a data processing system, location information indicating a permissible geographical location in which a virtual machine image for a consumer may be deployed. A request for an exception is issued, from the data processing system, to deploy the virtual machine image outside of the permissible geographical location. An exception grant or an exception denial is received, at the data processing system, from the consumer in response to the request. The virtual machine image is deployed, using the data processing system, to one or more servers in the computing environment that are outside of the permissible geographical location in response to receipt of the exception grant. The virtual machine image is deployed, using the data processing system, to one or more servers in the computing environment that are within the permissible geographical location in response to receipt of the exception denial.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
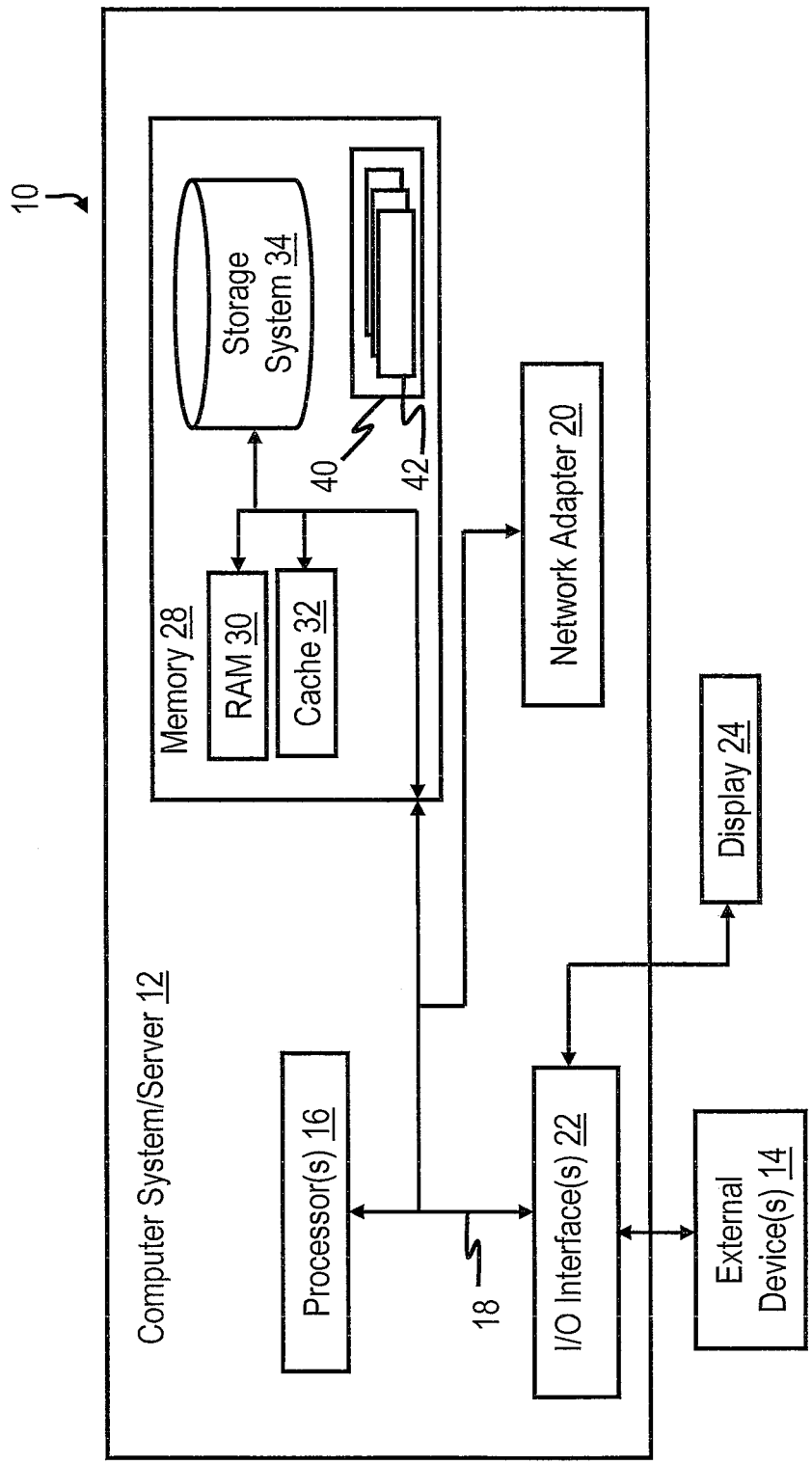
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for addressing geographical location issues in cloud computing environments.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

According to one aspect of the present disclosure, a tool set that stores information maps of a virtual environment and allows virtual machines (VMs) to self-determine and report their geographical location (in the form of Internet protocol (IP) addresses) is employed. The tool set provides a mechanism for the cloud vendor to understand constraints relative to clouds based on content, without the cloud consumer having to provide details on the content.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed, including client-server and peer-to-peer computing environments. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
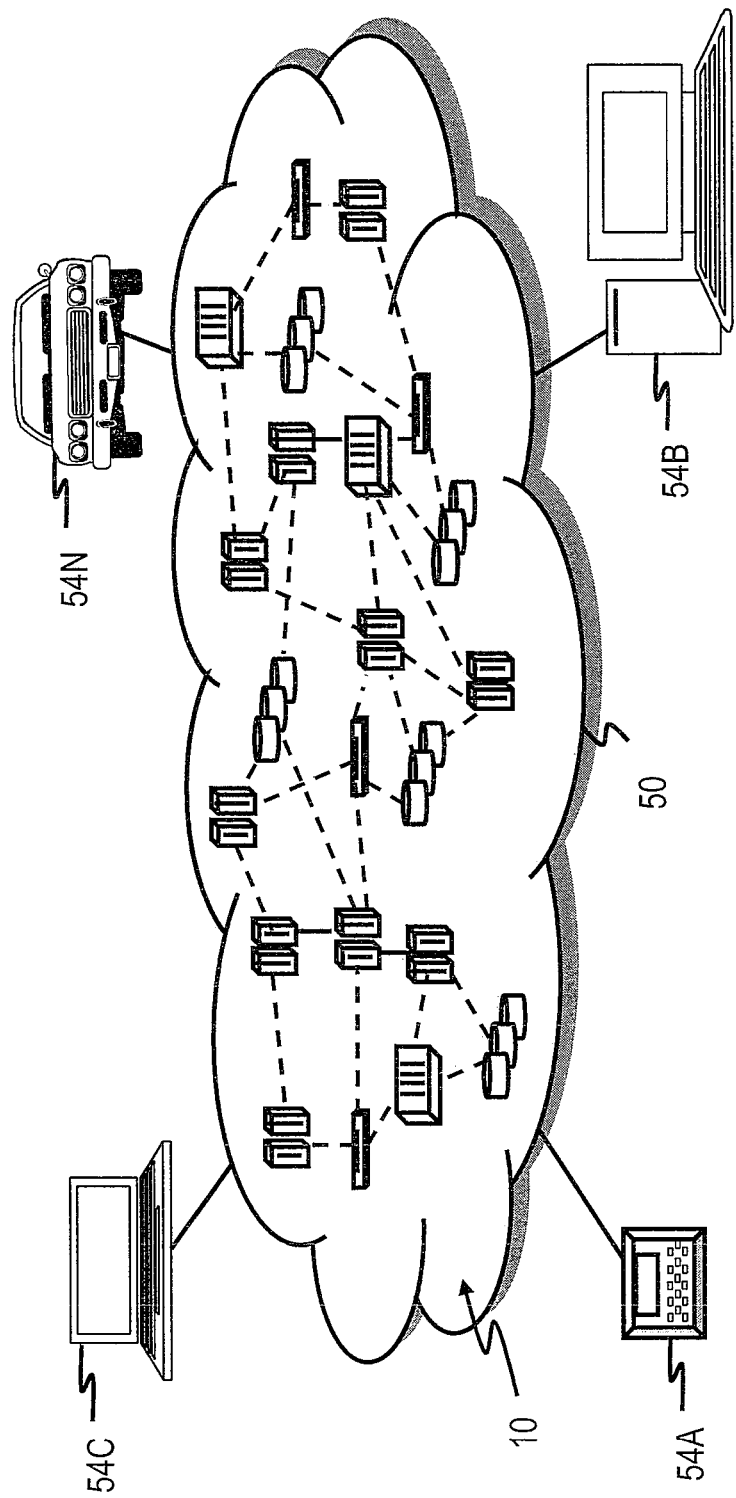
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
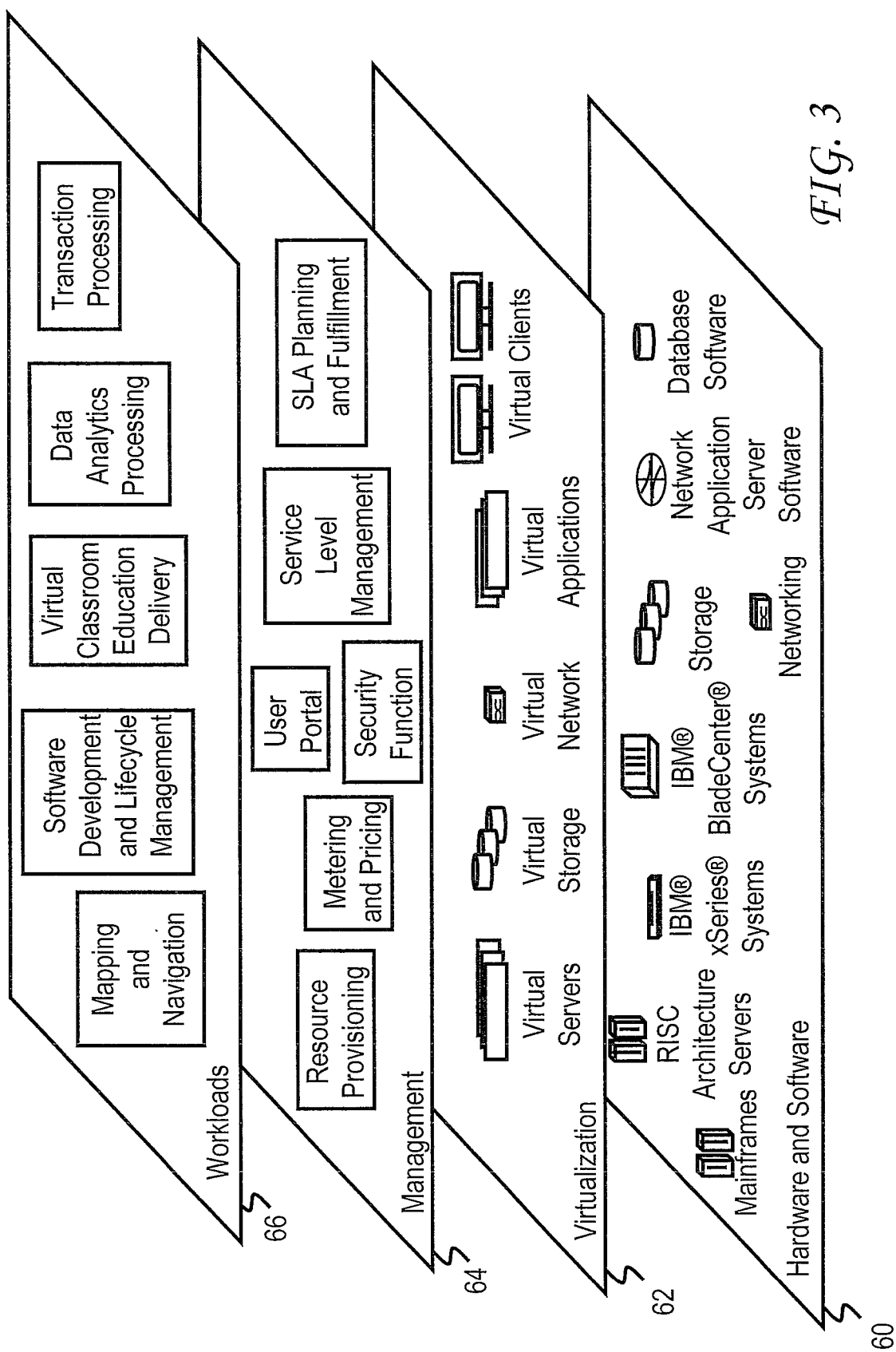
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM pSeries® systems), IBM xSeries® systems, IBM BladeCenter® systems, storage devices, networks and networking components. As another example, the software components may include network application server software (e.g., IBM WebSphere® application server software) and database software (e.g., IBM DB2®, database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

According to one aspect of the present disclosure, a mapping system is implemented in a server of a cloud to cross-correlate Internet protocol (IP) address assignments with physical device locations and workloads (e.g., one or more VM images, which provide all resources required to execute an application on a server). The mapping system may be implemented in a different server or the same server as a management server (data processing system) that is configured to address geographical location issues in the cloud. According to another aspect of the present disclosure, client-side technology is implemented to support exception requests from the management server. According to this aspect, the management server is configured to notify a cloud consumer when changes in location of a workload (e.g., including one or more virtual machine images and/or an associated data set) are desired (e.g., due to workload balancing, server downtime, etc.) and to request permission to move the workload to a geographical location that the cloud consumer had not previously indicated to be a permissible geographical location. The client-side technology may implement rules regarding permissible geographical locations for a workload to allow a cloud consumer to communicate (to the management server) exceptions and rules applicable to a specific workload.

Figure 4:
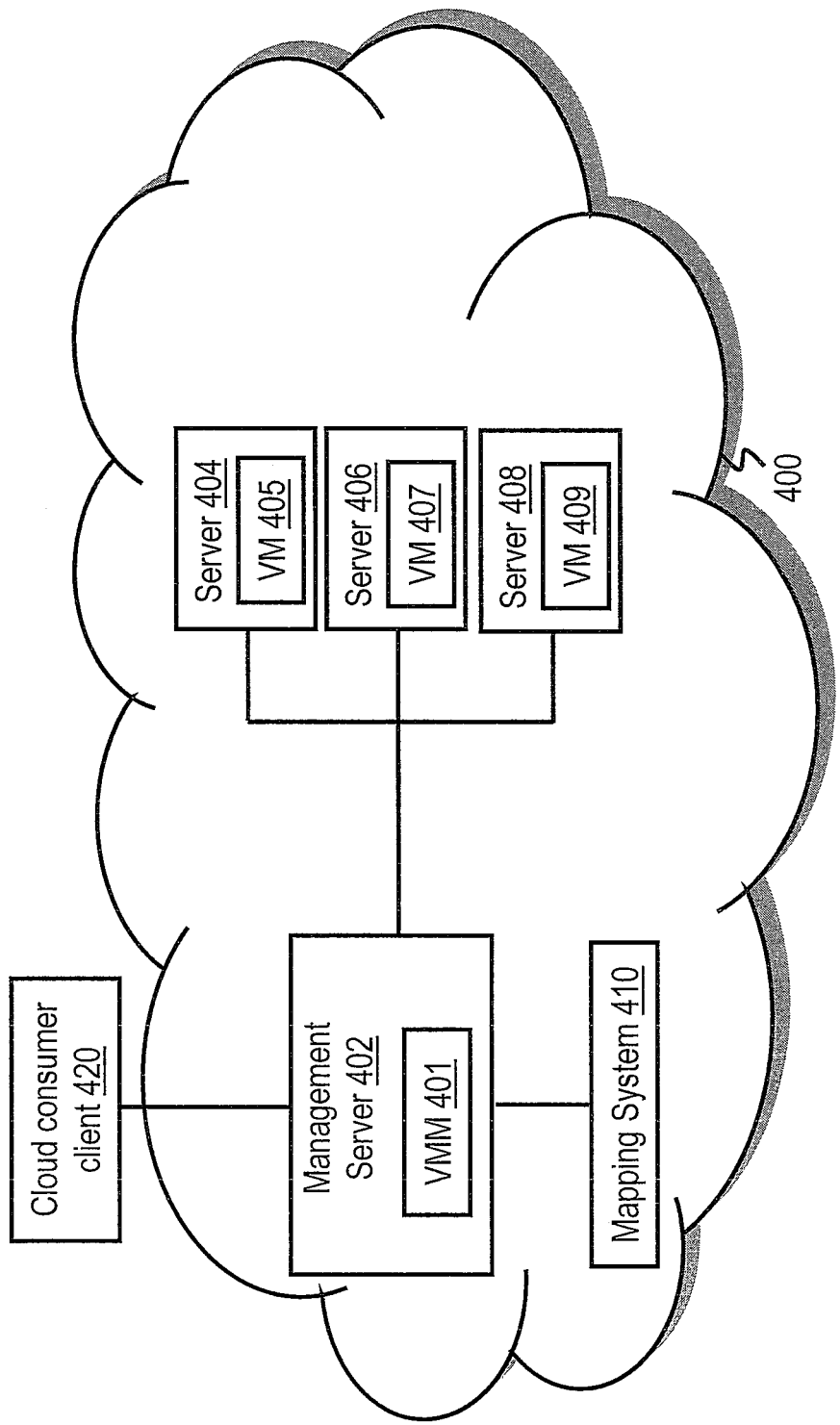
FIG. 4 is a diagram of a relevant portion of an exemplary cloud computing environment that includes a management server (data processing system) configured in accordance with various embodiments of the present disclosure to address geographical location issues in the cloud computing environment.

With reference to FIG. 4, an exemplary cloud computing environment 400 includes a management server (data processing system) 402 that is in communication with a mapping system 410 and exemplary servers 404, 406, and 408. As is shown in FIG. 4, server 404 executes virtual machine (VM) 405, server 406 executes VM 407, and server 408 executes VM 409. While only three servers 404, 406, and 408 are illustrated in cloud computing environment 400, it should be appreciated that more or less than three servers may be implemented within a cloud computing environment configured according to the present disclosure. Moreover, while servers 404, 406, and 408 are only illustrated as executing a single VM, it should be appreciated that servers 404, 406, and 408 may each execute one or more VMs and may each execute one or more virtual machine monitors (VMMs), which may be implemented, for example, in hardware and software layer 60, virtualization layer 62, or as a resource provisioning function in management layer 64 of computing environment 50.

Management server 402, as well as servers 404, 406, and 408, may be configured in a similar manner as computer system/server 12 of FIG. 1. Management server 402 may, for example, be implemented within hardware and software layer 60 of computing environment 50. In this example, servers 404, 406, and 408 may be in different geographical locations (e.g., different states (e.g., Texas, Missouri, and Michigan) within the United States or different countries (e.g., Canada, Mexico, and the United States)).

Mapping system 410 is configured to convert reported Internet protocol (IP) addresses of servers within cloud computing environment 400 to geographical locations, such that management server 402 may determine a geographical location of the servers within cloud computing environment 400. For example, VMs 405, 407, and 409 may be configured to self-report respective IP addresses of servers 404, 406, and 408. IP addresses may be directly reported to mapping system 410 or indirectly reported to mapping system 410, via, for example, a virtual machine monitor 401 (or other agent) of management server 404. In this manner, management server 402 may determine whether a workload may be immediately deployed/migrated to one or more of servers within cloud computing environment 400, or if an exception request (from management server 402 to cloud consumer client 420) is required to deploy/migrate a workload outside of a cloud consumer specified geographical location. In an alternative embodiment, management server 402 (or another component of cloud computing environment 400) may perform the mapping function of mapping system 410.

As is illustrated, management server 402 is also in communication with cloud consumer client 420. Management server 402 is configured to receive location information (from cloud consumer client 420) indicating, for example, through inclusive or exclusive inputs, one or more permissible geographical locations in which one or more workloads (e.g., VM images) for a cloud consumer may be deployed. For example, when the cloud consumer is a financial institution, due to privacy concerns (and encryption requirements) the cloud consumer may specify (via cloud consumer client 420) that one or more VM images that implement an application that processes data for the cloud consumer may only be deployed/migrated to certain specified states (or political subdivisions) within the United States. In this case, the workload may correspond to transaction processing for the financial institution. Assuming that adequate resources are available, management server 402 may deploy one or more VM images to one or more servers at a geographical location specified by the cloud consumer to be permissible.

In the event that adequate resources are not available to deploy/migrate a VM image to a server at a permissible geographical location (or for some other reason it is desirable to deploy/migrate the workload to a geographical location that was not specified by a cloud consumer to be permissible), management server 402 may communicate an exception request to the cloud consumer to deploy/migrate a workload to one or more servers at a geographical location that was not specified by the cloud consumer to be permissible. For example, management server 402 may communicate an incentive (e.g., a lower service rate) to the cloud consumer in conjunction with the exception request in an attempt to incentivize the cloud consumer to grant the exception request.

It should be appreciated that management server 402 may also be configured to log deployment/migration of workloads (e.g., in storage (e.g., a hard disk drive (HDD)) associated with management server 402 or in storage (e.g., network attached storage (NAS) or a storage area network (SAN) in cloud computing environment 400) to provide an audit trail for client 420. The log may be periodically communicated from management server 402 to client 420 or may be communicated to client 420 on-demand. Alternatively, another component within cloud computer environment 400 may log deployment/migration of workloads, as communicated from management server 402.

Figure 5:
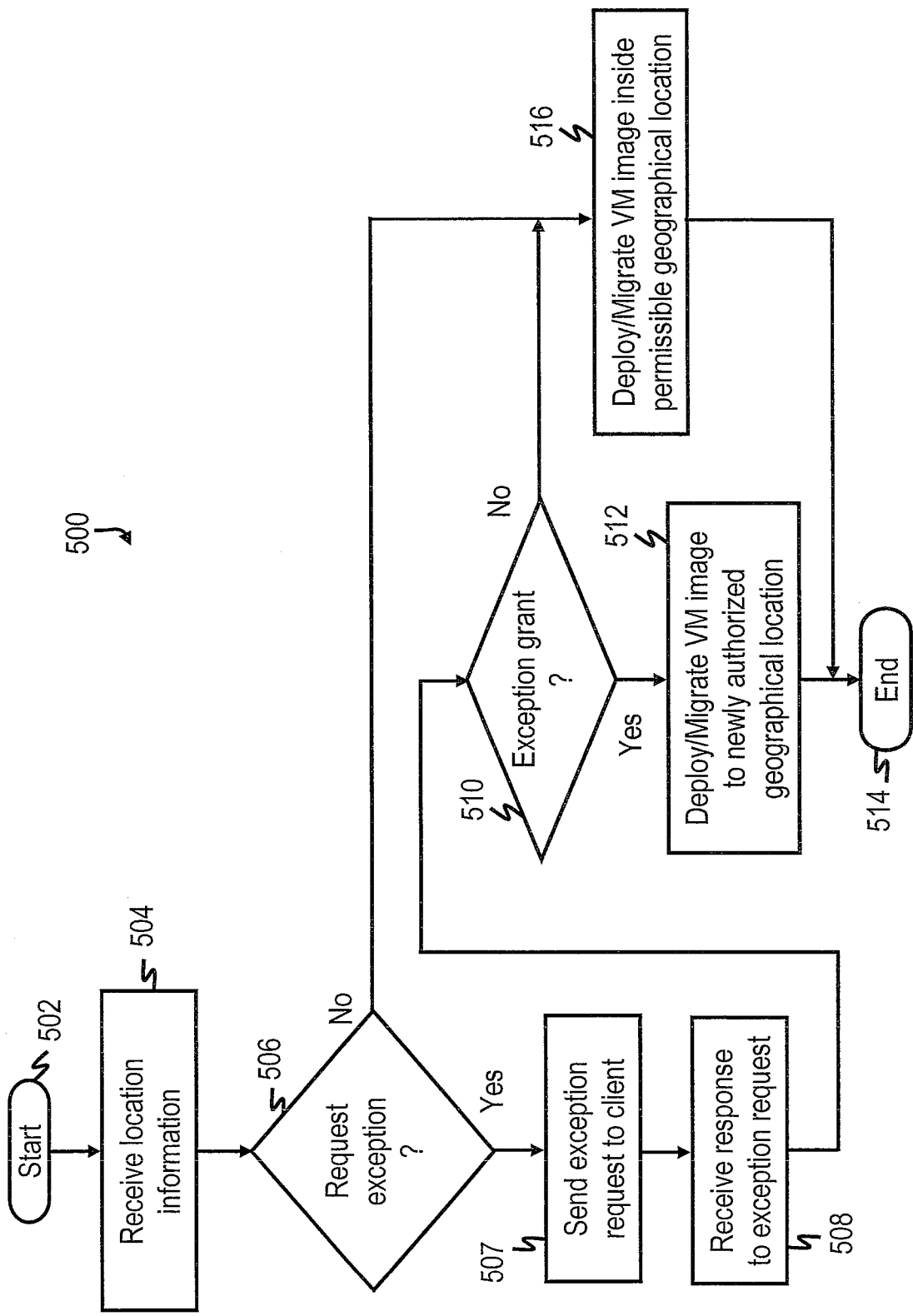
FIG. 5 is a flow chart for an exemplary process that implements techniques for addressing geographical location issues in a cloud computing environment according to various embodiments of the present disclosure.

With reference to FIG. 5, a flow chart for an exemplary geographical location process 500 (for addressing geographical location issues in a cloud computing environment according to various embodiments of the present disclosure) is illustrated. For ease of understanding, process 500 is discussed in conjunction with cloud computing environment 400 of FIG. 4. Process 500 may, for example, execute as an agent of management server 402. Process 500 begins (e.g., in response to a request by a cloud consumer for services) at block 502, at which point control transfers to block 504. In block 504, management server 402 receives location information from client 420. For example, management server 402 may receive location information from client 420 in conjunction with a service request from client 420. Alternatively, management server 402 may receive location information prior to a service request, for example, in a customer intake process of a cloud service provider.

Next, in block 506, management server 402 determines whether an exception request is desirable. For example, management server 402 may determine that a workload (i.e., one or more VM images) associated with client 420 cannot be deployed to a server at a permissible geographical location (as indicated by the location information received from client 420). As another example, management server 402 may determine that a workload associated with client 420 would be better served by one or more servers at geographical locations that were not indicated by client 420 to be permissible. When an exception request is not desirable in block 506 control transfers to block 516, where management server 402 initiates deployment/migration of a workload (e.g., one or more VM images and associated data sets) for client 420 to one or more servers in the permissible geographical location. For example, management server 402 may implement VMM 401 to control the deployment/migration of VMs or may communicate with one or more VMMs (not shown in FIG. 4) executed by other components of cloud computing environment 400 to initiate deployment/migration of VMs. When an exception request is desirable in block 506, control transfers to block 507. In block 507, management server 402 sends an exception request to client 420 and control transfers to block 508.

In block 508, management server 402 waits for a response to the exception request from client 420. When a response to the exception request is received by management server 402, control transfers to decision block 510. In block 510, management server 402 determines whether an exception grant or an exception denial was received. When an exception grant is received in block 510, control transfers to block 512 where management server 402 initiates deployment/migration of a workload (e.g., one or more VM images) for client 420 to one or more servers in one or more newly authorized geographical locations not included in the originally permissible geographical locations. In block 512, management server 402 may also initiate logging of the geographical locations to provide an audit trail. When an exception denial is received in block 510, control transfers to block 516 where management server 402 initiates deployment/migration of a workload (e.g., one or more VM images) for client 420 to one or more servers at the permissible geographical location (assuming one or more servers are available to process the workload). In block 516, management server 402 may also initiate logging of the geographical location to provide an audit trail. For example, management server 402 may initiate deployment of VM 405 to server 404 and migration of VM 407 deployed on server 406 to server 408, which is already executing VM 409. Following block 516, control transfers to block 514 where process 500 ends until another workload requires deployment or migration.

In the flow chart above, the method depicted in FIG. 5 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for addressing geographical location issues in a computing environment, comprising:
    receiving, at a data processing system, location information indicating a permissible geographical location in which a virtual machine image for a consumer may be deployed;
    issuing, from the data processing system, a request for an exception to deploy the virtual machine image outside of the permissible geographical location;
    receiving, at the data processing system, an exception grant or an exception denial from the consumer in response to the request;
    deploying, using the data processing system, the virtual machine image to one or more servers in the computing environment that are outside of the permissible geographical location in response to receipt of the exception grant; and
    deploying, using the data processing system, the virtual machine image to one or more servers in the computing environment that are within the permissible geographical location in response to receipt of the exception denial.

2. The method of claim 1, wherein the deploying, using the data processing system, the virtual machine image to one or more servers in the computing environment that are outside of the permissible geographical location comprises:
    migrating, using the data processing system, the virtual machine image to one or more servers within the computing environment that are outside of the permissible geographical location in response to receipt of the exception grant.

3. The method of claim 1, wherein the permissible geographical location corresponds to one or more countries.

4. The method of claim 1, wherein the permissible geographical location corresponds to one or more political subdivisions within a country.

5. The method of claim 1, wherein the data processing system implements a mapping system that is configured to map Internet protocol (IP) addresses of servers in the computing environment to a geographical location.

6. The method of claim 1, wherein the computing environment is a cloud computing environment that includes a mapping system that is configured to map Internet protocol (IP) addresses of servers in the cloud computing environment to a geographical location.

7. The method of claim 1, wherein the data processing system is further configured to log geographical locations where the virtual machine image has been deployed to provide an audit trail.

8. A computer program product for addressing geographical location issues in a computing environment, the computer program product comprising:
    a computer-readable storage medium having computer-readable program code embodied thereon, wherein the computer-readable program code, when executed by a data processing system, causes the data processing system to:
    receive location information indicating a permissible geographical location in which a virtual machine image for a consumer may be deployed;
    issue a request for an exception to deploy the virtual machine image outside of the permissible geographical location;
    receive an exception grant or an exception denial from the consumer in response to the request;
    deploy the virtual machine image to one or more servers in the computing environment that are outside of the permissible geographical location in response to receipt of the exception grant; and
    deploy the virtual machine image to one or more servers in the computing environment that are within the permissible geographical location in response to receipt of the exception denial.

9. The computer program product of claim 8, wherein the computer-readable program code that deploys the virtual machine image to one or more servers in the computing environment that are outside of the permissible geographical location, when executed by the data processing system, causes the data processing system to:
    migrate the virtual machine image to one or more servers within the computing environment that are outside of the permissible geographical location in response to receipt of the exception grant.

10. The computer program product of claim 8, wherein the permissible geographical location corresponds to one or more countries.

11. The computer program product of claim 8, wherein the permissible geographical location corresponds to one or more political subdivisions within a country.

12. The computer program product of claim 8, wherein the computer-readable program code, when executed by the data processing system, causes the data processing system to implement a mapping system that is configured to map Internet protocol (IP) addresses of servers in the computing environment to a geographical location.

13. The computer program product of claim 8, wherein the computing environment is a cloud computing environment that includes a mapping system that is configured to map Internet protocol (IP) addresses of servers in the cloud computing environment to a geographical location.

14. The computer program product of claim 8, wherein the data processing system is configured to log geographical locations where the virtual machine image has been deployed to provide an audit trail.

15. A data processing system, comprising:
a memory; and
a processor core coupled to the memory, wherein the processor core is configured to:
receive location information indicating a permissible geographical location in which a virtual machine image for a consumer may be deployed;
issue a request for an exception to deploy the virtual machine image outside of the permissible geographical location;
receive an exception grant or an exception denial from the consumer in response to the request;
deploy the virtual machine image to one or more servers in the computing environment that are outside of the permissible geographical location in response to receipt of the exception grant; and
deploy the virtual machine image to one or more servers in the computing environment that are within the permissible geographical location in response to receipt of the exception denial.

16. The data processing system of claim 15, wherein the processor core is configured to deploy the virtual machine image to one or more servers in the computing environment that are outside of the permissible geographical location by:
migrating the virtual machine image to one or more servers within the computing environment that are outside of the permissible geographical location in response to receipt of the exception grant.

17. The data processing system of claim 15, wherein the permissible geographical location corresponds to one or more countries or one or more political subdivisions within a country.

18. The data processing system of claim 15, wherein the processor core is further configured to implement a mapping system that is configured to map Internet protocol (IP) addresses of servers in the computing environment to a geographical location.

19. The data processing system of claim 15, wherein the computing environment is a cloud computing environment that includes a mapping system that is configured to map Internet protocol (IP) addresses of servers in the cloud computing environment to a geographical location.

20. The data processing system of claim 15, wherein the data processing system is configured to log geographical locations where the virtual machine image has been deployed to provide an audit trail.

* * * * *